(12) United States Patent
Jomaa et al.

(10) Patent No.: US 11,703,102 B2
(45) Date of Patent: Jul. 18, 2023

(54) MOUNT BUSHING WITH INTEGRATED ISOLATED INSERT FOR ENHANCED HIGH FREQUENCY ISOLATION PERFORMANCE

(71) Applicant: GM GLOBAL TECHNOLOGY OPERATIONS LLC, Detroit, MI (US)

(72) Inventors: Sam Mohamad Jomaa, Northville, MI (US); Wojciech Edward Suchta, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 17/231,687

(22) Filed: Apr. 15, 2021

(65) Prior Publication Data

US 2022/0333667 A1    Oct. 20, 2022

(51) Int. Cl.
| | | |
|---|---|---|
| *F16F 1/38* | (2006.01) | |
| *F16F 15/08* | (2006.01) | |
| *H02K 5/24* | (2006.01) | |
| *B60K 1/00* | (2006.01) | |

(52) U.S. Cl.
CPC .............. *F16F 15/08* (2013.01); *B60K 1/00* (2013.01); *H02K 5/24* (2013.01); *F16F 2224/025* (2013.01)

(58) Field of Classification Search
CPC ...... F16F 15/08; F16F 2224/025; F16F 13/14; F16F 13/1463; B60K 1/00; H02K 5/24; B60G 2204/41062
See application file for complete search history.

(56) References Cited

U.S. PATENT DOCUMENTS

| | | | | |
|---|---|---|---|---|
| 4,728,086 | A | * | 3/1988 | Ishiyama ................ F16F 13/20 |
| | | | | 267/141.2 |
| 5,299,790 | A | | 4/1994 | Whightsil, Sr. |
| 6,435,486 | B2 | * | 8/2002 | Maier ................ F16F 13/1418 |
| | | | | 267/140.12 |
| 7,367,551 | B2 | | 5/2008 | Kumper |
| 7,922,156 | B2 | | 4/2011 | Goudie |
| 8,196,911 | B2 | | 6/2012 | Baumbarger |

(Continued)

FOREIGN PATENT DOCUMENTS

| | | |
|---|---|---|
| GB | 2027517 A | 2/1980 |
| JP | 03084230 A | 11/1992 |

(Continued)

OTHER PUBLICATIONS

Non-Final Office Action dated Oct. 4, 2022, corresponding to U.S. Appl. No. 17/385,673.

(Continued)

*Primary Examiner* — Terrell L McKinnon
*Assistant Examiner* — Jerry Olivier

(57) ABSTRACT

A mount bushing includes an outer ring adapted for connection to a mount structure. A tubular bushing insert is disposed inside the outer ring and a main elastomeric isolation arrangement disposed between the outer ring and the tubular bushing insert. A secondary elastomeric element is disposed inside the tubular bushing insert, wherein the secondary elastomeric element is isolated from the main elastomeric isolation element by the tubular bushing insert. A structural tube is disposed inside the secondary elastomeric element and a mounting bolt is inserted through the structural tube.

2 Claims, 4 Drawing Sheets

(56) References Cited

U.S. PATENT DOCUMENTS

| | | | |
|---|---|---|---|
| 8,967,598 B2* | 3/2015 | Whear | F16F 3/0873 |
| | | | 267/141.1 |
| 2020/0096073 A1* | 3/2020 | Miyazaki | F16F 15/022 |
| 2022/0032703 A1* | 2/2022 | Otsu | F16F 13/14 |

FOREIGN PATENT DOCUMENTS

| | | |
|---|---|---|
| JP | H08177918 A | 7/1996 |
| WO | WO-2006024426 A2 | 3/2006 |
| WO | 2019049752 A1 | 3/2019 |

OTHER PUBLICATIONS

First Office Action for Chinese Patent Application No. 202210390615.4 dated Apr. 3, 2023 with correspondence dated Apr. 23, 2023 from China Patent Agent (H.K.) Ltd summarizing content, 10 pages.

* cited by examiner

MOUNT BUSHING WITH INTEGRATED ISOLATED INSERT FOR ENHANCED HIGH FREQUENCY ISOLATION PERFORMANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a mount bushing with an integrated isolated insert for enhanced high frequency isolation performance. Electric vehicle drive units exhibit source energy with prevalent frequencies up to 3000 Hz. Propulsion mounts and supporting structure have to provide sufficient isolation for this expanded frequency range. Often, structural components of the mount assembly or the drive unit exhibit resonances in the frequency range of 300-2000 Hz that will require added Tuned Vibration Absorber (TVA) to mitigate these resonances, at significant added mass, cost, and packaging space. In addition, the drive unit motor may exhibit source energy at certain vibration orders that require enhanced isolation in the mounts.

SUMMARY

A mount bushing includes an outer ring adapted for connection to a mount structure. A tubular bushing insert is disposed inside the outer ring and a main elastomeric isolation arrangement disposed between the outer ring and the tubular bushing insert. A secondary elastomeric element is disposed inside the tubular bushing insert, wherein the secondary elastomeric element is isolated from the main elastomeric isolation element by the tubular bushing insert. A structural tube is disposed inside the secondary elastomeric element and a mounting bolt is inserted through the structural tube. The mount bushing design provides enhanced vibration isolation at high frequencies and negates the need to add the dead mass of traditional tuned vibration absorbers, or potentially make costly changes to the drive unit motor or other structural components in the isolation path.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Example embodiments will now be described more fully with reference to the accompanying drawings.

Figure 1:
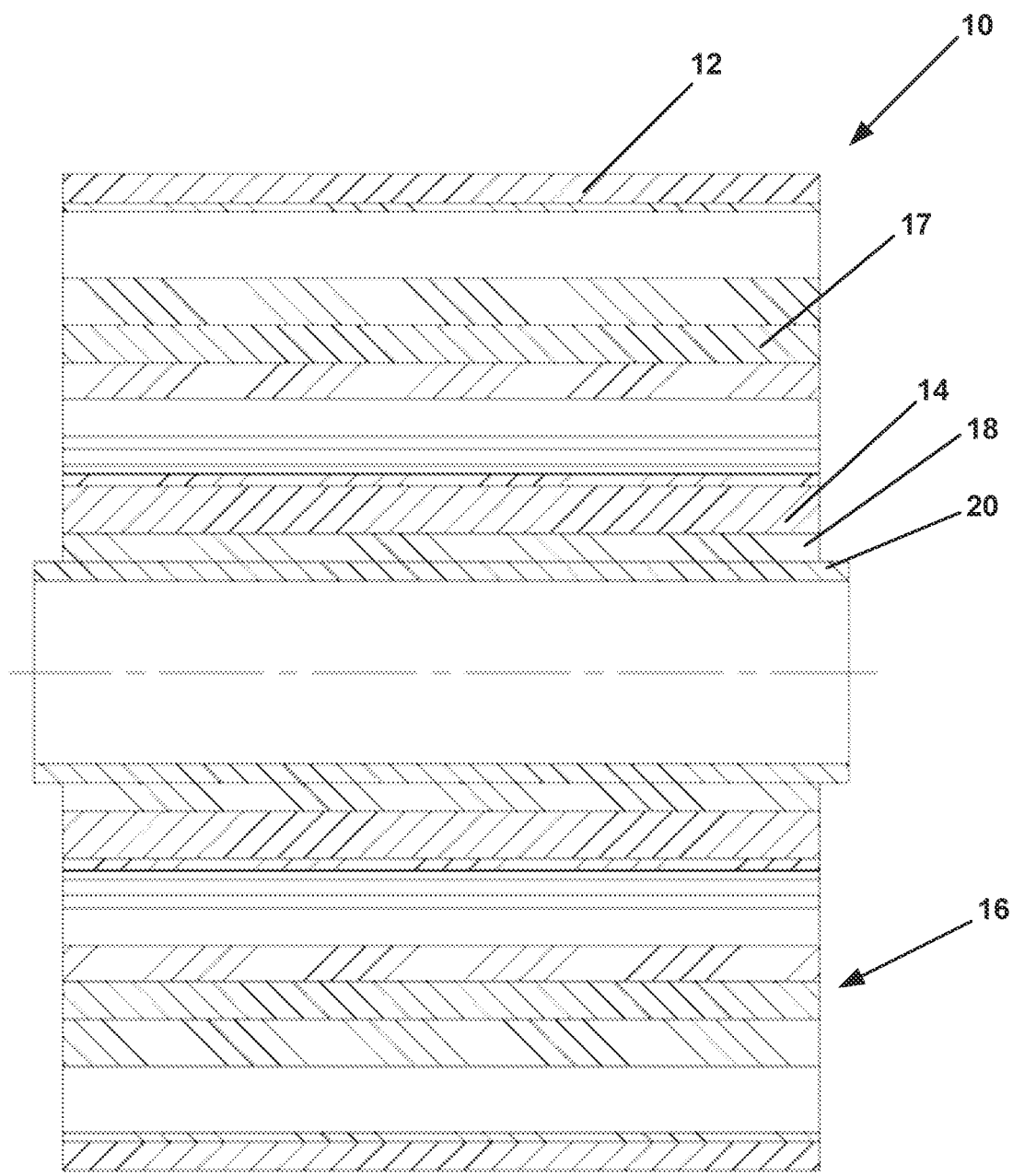
FIG. 1 is longitudinal cross-sectional view of a mount bushing according to the principles of the present disclosure.
Figure 2:
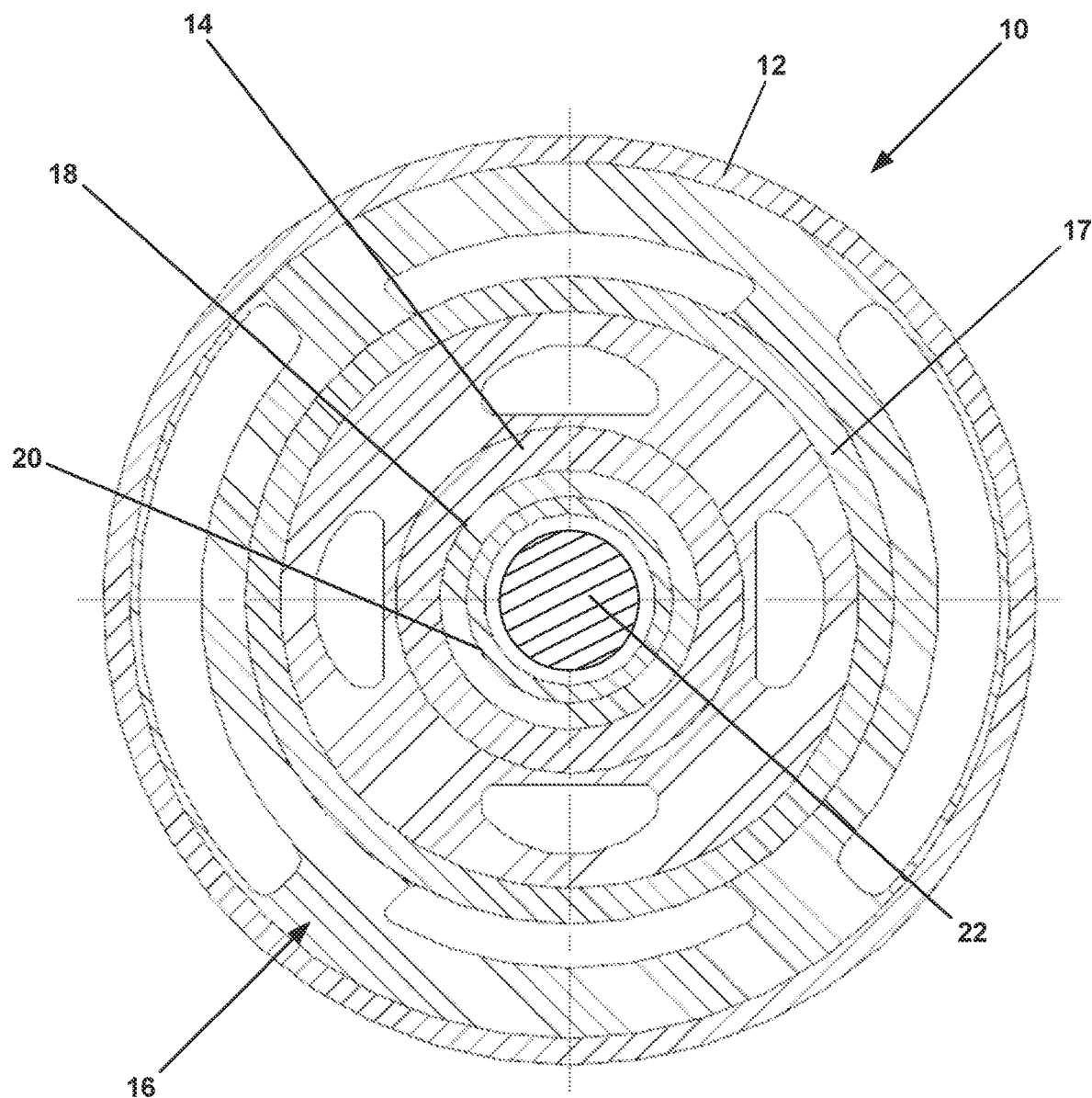
FIG. 2 is a lateral cross-section view of the mount bushing according to the principles of the present disclosure.

With reference to FIGS. 1 and 2, a longitudinal and a lateral cross sectional view are shown of an exemplary mount bushing 10 according to the principles of the present disclosure. The mount bushing 10 is designed for improved isolation of high frequency vibrations in a mount structure for an electric vehicle drive unit although the mount bushing 10 could be used in other applications. The mount bushing 10 includes an outer ring 12 that is received in or integrally formed as part of a mount structure that is adapted to be connected to an electric motor. A tubular bushing insert 14 is disposed inside the outer ring 12. A main elastomeric isolation arrangement 16 is disposed between the outer ring 12 and the tubular bushing insert 14. The main elastomeric isolation arrangement 16 can include a mass element 17 supported by inner and outer rubber or other elastomeric material for providing a double isolation arrangement which will be described in further detail herein with reference to FIG. 3b. A secondary elastomeric element 18 is disposed inside the tubular bushing insert 14 and a structural tube 20 is disposed inside the secondary elastomeric element 18. A mounting bolt 22 is inserted through the structural tube 20 for securing the structural tube 20 of the mount bushing 10 to a frame or chassis of a vehicle. The structural tube 20 and the tubular bushing insert 14 can have cylindrical and other shaped cross sections.

The length, thickness (general shape) and choice of material of the secondary elastomeric element 18 can be selected to provide a mount resonance at a specified frequency to achieve desired higher frequency vibration isolation. According to an exemplary embodiment, the secondary elastomeric element 18 can be made from natural rubber NR, high damping NR, synthetic rubber, silicone, or similar elastomers suitable for vibration isolation rubber and can have an outer diameter of less than 35 mm and an inner diameter of at least 23.5 mm (for M12 bolt and 3 mm steel tube, 19 mm).

The mount bushing 10 of the present disclosure provides integrated design features that enhances high frequency isolation related to resonant modes of the mount supporting structural components (brackets) and/or general excitation energy from the drive unit. The mount bushing 10 utilizes the mass and structure of the bushing to create a mass-damper effect for high frequency isolation without adding significant additional mass or occupying additional package space. The concept can be utilized with any type of bushing design with minor modification to the internal components of the bushing. The improved mount bushing design 10 provides a structural tube 20 and a secondary layer of elastomeric material 18 housed in the inner bushing insert 14 of the main rubber element 16. The isolated structural tube 20 also functions as the support for the bushing assembly 10 to the mounting structure (vehicle frame or chassis). The mass of the bushing assembly 10 components attached to the isolated structural tube 20 and outer ring 12 acts as a mass damper tuned for specific frequency to reduce vibration associated with the excitation energy.

Figure 3C:
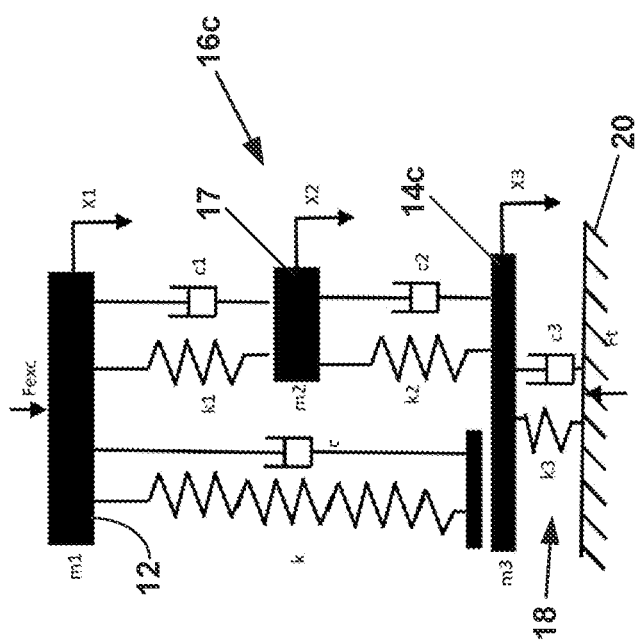
FIG. 3c is a schematic illustration of a load decoupled double isolation mount with the integrated isolated insert according to the principles of the present disclosure.
Figure 3B:
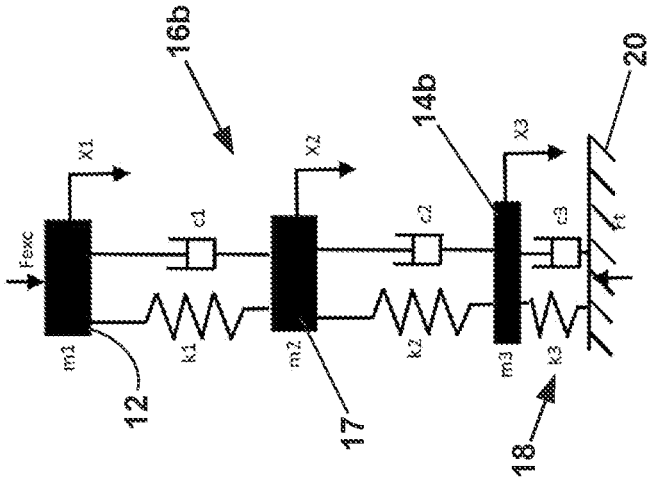
FIG. 3b is a schematic illustration of a double isolation mount with the integrated isolated insert according to the principles of the present disclosure.
Figure 3A:
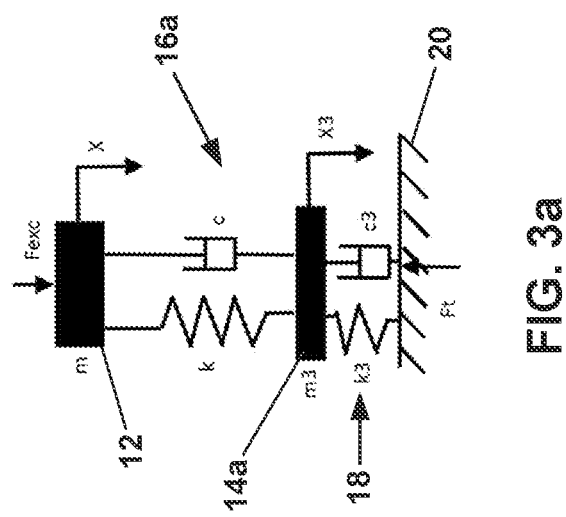
FIG. 3a is a schematic illustration of a single isolation mount with the integrated isolated insert according to the principles of the present disclosure.

With reference to FIGS. 3a-3c, the main elastomeric isolation arrangement 16 can take on different known forms and for example, can be one of a single isolation arrangement as shown in FIG. 3a, a double isolation arrangement as shown in FIG. 3b and a load-decoupled double isolation arrangement as shown in FIG. 3c. These are simplified one-dimensional representations of actual mounts that are otherwise three-dimensional and exhibit these characteristics in three orthogonal directions. The springs and dampers are lumped parameters of physical components of the mount for the sake of mathematical characterization. A single spring or a single damper can represent the function of multiple physical components of the mount acting singularly or in combination.

In a single isolation arrangement 16a as shown in FIG. 3a, exterior forces ($F_{exc}$) applied to the mass (m) of the drive unit supported by the mount bushing 10a (as part of a mounting system with multiple bushings) are transmitted to the tubular bushing insert 14a by a single spring and damper arrangement k, c in a form of an elastomeric material such as rubber. According to the principles of the present disclosure, the secondary elastomeric element 18 is designed to provide high frequency vibration isolation between the tubular bushing insert 14 and the structural tube 20. The secondary elastomeric element 18 can be formed from rubber or other elastomeric material. The secondary elastomeric element 18 is isolated from the main elastomeric isolation element 16 by the tubular bushing insert 14a.

In a double isolation arrangement 16b as shown in FIG. 3b, exterior forces ($F_{exc}$) applied to the mass (m) of the drive unit supported by the mount bushing 10b (as part of a mounting system with multiple bushings) are transmitted to the tubular bushing insert 14b by a pair of spring and damper elements k1, c1; k2, c2 each in a form of an elastomeric material such as rubber and an intermediate mass element 17. According to the principles of the present disclosure, the secondary elastomeric element 18 is designed to provide high frequency vibration isolation between the tubular bushing insert 14b and the structural tube 20. The secondary elastomeric element 18 can be formed from rubber or other elastomeric material. The secondary elastomeric element 18 is isolated from the main elastomeric isolation element 16 by the tubular bushing insert 14b.

In a load decoupled double isolation arrangement 16c as shown in FIG. 3c, exterior forces ($F_{exc}$) applied to the mass (m) of the drive unit supported by the mount bushing 10c (as part of a mounting system with multiple bushings) are transmitted to the tubular bushing insert 14c by both a single spring and damper arrangement k, c and a pair of spring and damper elements k1, c1; k2, c2 each in a form of an elastomeric material such as rubber and an intermediate mass element 17. According to the principles of the present disclosure, the secondary elastomeric element 18 is designed to provide high frequency vibration isolation between the tubular bushing insert 14c and the structural tube 20. The secondary elastomeric element 18 can be formed from rubber or other elastomeric material. The secondary elastomeric element 18 is isolated from the main elastomeric isolation element 16 by the tubular bushing insert 14c.

Figure 4:
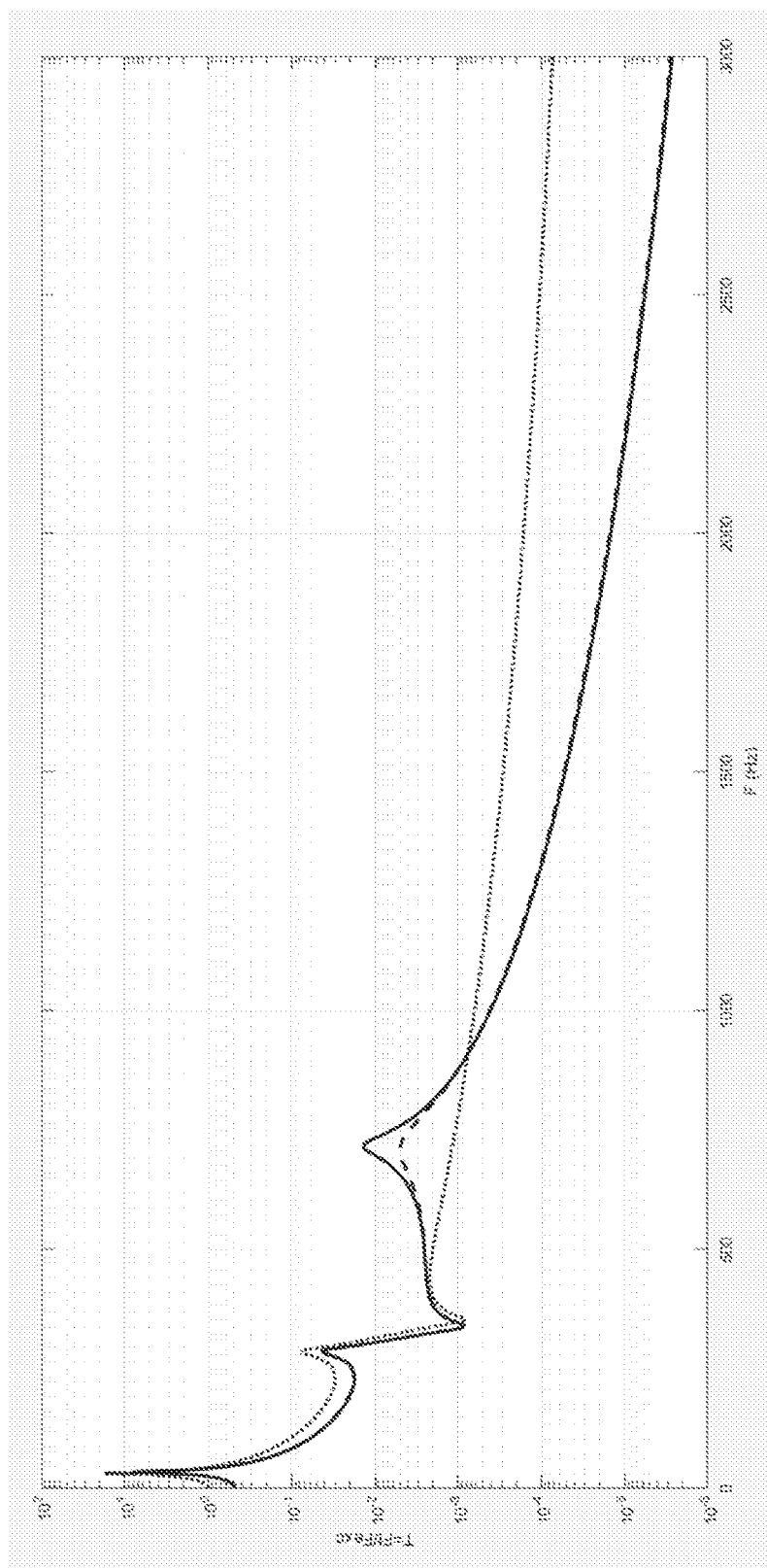
FIG. 4 is a graphical illustration of the transmitted force ratio verses frequency for exemplary mount bushings according to the principles of the present disclosure.

With reference to FIG. 4, a force transmissibility graph is shown illustrating the improved high frequency isolation of the integrated isolation bushing insert 14 and secondary elastomeric element 18. In particular, the solid line and the dashed lines represent the force transmissibility of a load decoupled double isolation arrangement while the dashed line represents the force transmissibility of a load decoupled double isolation arrangement combined with the integrated isolation bushing insert 14 and secondary elastomeric element 18. In this example, in the frequency ranges greater than 900 Hz, the integrated isolation bushing insert 14 and secondary elastomeric element 18 of the present disclosure demonstrate reduced force transmissibility as compared to the load decoupled double isolation arrangement alone.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C".

What is claimed is:

1. A mount bushing, comprising:
   an outer ring adapted for connection to a mount structure;
   a bushing insert disposed inside the outer ring;
   a main elastomeric isolation arrangement disposed between the outer ring and the bushing insert, wherein the main elastomeric isolation arrangement is a single isolation arrangement, wherein the main elastomeric arrangement has a first radial thickness between the outer ring and the bushing insert;
   a secondary elastomeric element between the bushing insert and a structural insert that is inside the secondary elastomeric element, wherein the secondary elastomeric element is isolated from the main elastomeric isolation element by the bushing insert, the secondary elastomeric element having a uniform second radial thickness between the bushing insert and the structural insert that is smaller than the first radial thickness and the secondary elastomeric element having an outer diameter of less than 35 mm; and
   a mounting bolt inserted through a bore in the structural insert.

2. The mount bushing according to claim 1, wherein the secondary elastomeric element is made from natural rubber NR, high damping NR, synthetic rubber, silicone.

\* \* \* \* \*